(No Model.)

H. BLANKENBURG.
WIRE FENCE GATE.

No. 482,334. Patented Sept. 13, 1892.

Witnesses.
A. Ruppert.
G. B. Towles

Inventor.
Henry Blankenburg,
Per
Thomas P. Simpson
Atty

UNITED STATES PATENT OFFICE.

HENRY BLANKENBURG, OF LOHRVILLE, IOWA.

WIRE-FENCE GATE.

SPECIFICATION forming part of Letters Patent No. 482,334, dated September 13, 1892.

Application filed January 9, 1892. Serial No. 417,474. (No model.)

*To all whom it may concern:*

Be it known that I, HENRY BLANKENBURG, a citizen of the United States, residing at Lohrville, in the county of Calhoun and State of Iowa, have invented certain new and useful Improvements in Wire-Fence Gates; and I do hereby declare the following to be a full, clear, and exact description of the invention, such as will enable others skilled in the art to which it appertains to make and use the same.

The special object of the invention is to make a wire-fence gate which may be easily opened or closed by a person standing on the ground or sitting on horseback.

Figure 1:
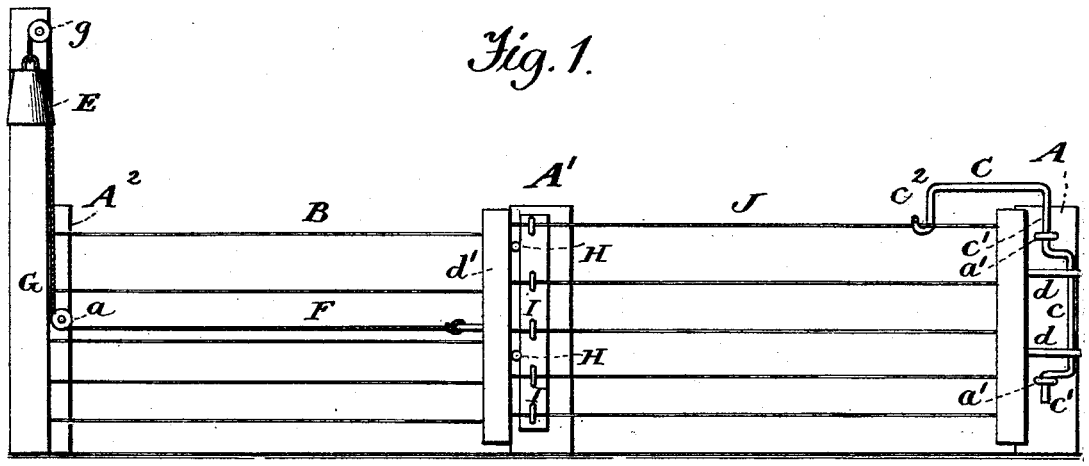
Figure 2:
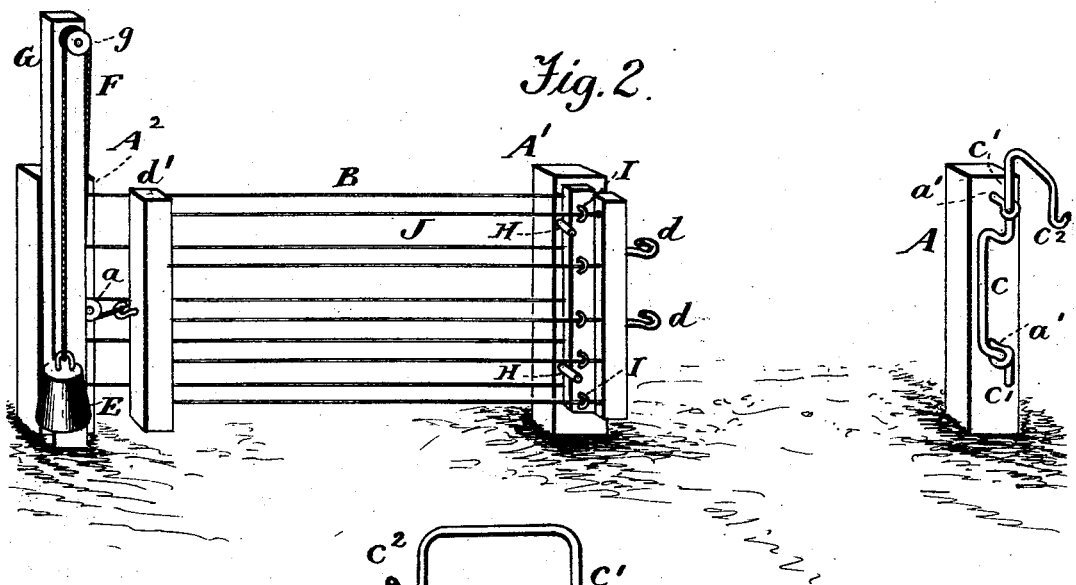
Figure 3:
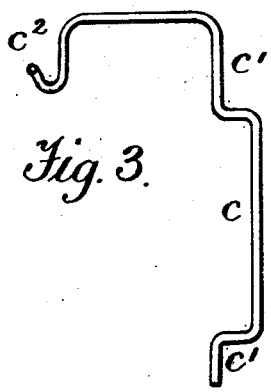

Figure 1 of the drawings is a side elevation showing the gate closed and latched; Fig. 2, a perspective view showing the gate open and the latch reversed. Fig. 3 is a detail view of the gate-latch.

In the drawings, A A' A² represent posts, and B ordinary wire rails, the latter being made and connected with the posts in any preferred way.

C is the latch, which has the long crank $c$, the journals $c'$ $c'$, working in post eyes or bearings $a'$ $a'$, and the hook-catch $c^2$ to engage the top rail of the gate.

E is a weight connected with the rear gate-stile $d'$ by means of the wire or cord F, which passes over the pulley $g$ near the top of a pole G and round the pulley $a$ of the fence-post A².

By unhooking the catch $c^2$ from the gate and turning the crank $c$ until it is released from the hooks $d$ $d$ on the front stile of the gate the latter is free to be moved back by the weight, so as to allow a vehicle to pass through. In order to fasten the gate the latch C is held with the crank $c$ turned toward the gate and the latter pulled forward until the hooks $d$ $d$ catch over said crank. The latch C is then turned about a half-revolution to bring the rear stile of the hook $c^2$, engaging the top rail J of the gate, against the stops H H on the post A'. I may also use guide-eyes I on the post A' to receive the rails J of the gate, and thus keep the gate always in a perpendicular plane and close to the post A'; but neither the stops H nor the guide-eyes are essential to the working of the gate. It will be seen that this gate may be conveniently opened by a person on the ground or on horseback.

Having thus described all that is necessary to a full understanding of my invention, what I claim as new, and desire to protect by Letters Patent, is—

The combination of a gate having the front hooks $d$ $d$, a post having the eyebolts $a'$ $a'$ on the front face, and a latch journaled in said eyebolts, the said latch being provided with a crank $c$ between the journals $c'$ $c'$ and with a bent-over hook end $c^2$, as and for the purpose described.

In testimony whereof I affix my signature in presence of two witnesses.

HENRY BLANKENBURG.

Witnesses:
   G. C. ROBERTSON,
   JOHN TAPPELER.